United States Patent [19]
Hohner et al.

[11] Patent Number: 5,814,994
[45] Date of Patent: Sep. 29, 1998

[54] CIRCUIT LAYOUT FOR ION CURRENT MEASUREMENT

[75] Inventors: Peter Hohner, Echterdingen; Jens Schirmer, Heilbronn, both of Germany

[73] Assignees: Temic Telefunken Microelectronic GhmB, Heilbronn; Daimler-Benz AG, Stuttgart, both of Germany

[21] Appl. No.: 675,640

[22] Filed: Jul. 3, 1996

[30] Foreign Application Priority Data

Jul. 5, 1995 [DE] Germany .................. 195 24 541.5

[51] Int. Cl.$^6$ ............................................. F02P 17/00
[52] U.S. Cl. .................. 324/380; 123/425; 324/388; 324/397
[58] Field of Search ...................... 324/380, 381, 324/388, 393, 399, 402; 123/425, 630, 644

[56] References Cited

U.S. PATENT DOCUMENTS

| | | | |
|---|---|---|---|
| 4,041,373 | 8/1977 | Maringer | 324/133 |
| 4,377,140 | 3/1983 | Latsch | 123/425 |
| 4,491,110 | 1/1985 | Bone et al. | 123/425 |
| 5,146,893 | 9/1992 | Ohsawa | 123/425 |
| 5,293,129 | 3/1994 | Ikeuchi et al. | 324/388 |
| 5,349,299 | 9/1994 | Kanehiro et al. | 324/380 |
| 5,425,339 | 6/1995 | Fukui | 123/416 |
| 5,495,757 | 3/1996 | Atanasyan et al. | 324/380 |
| 5,534,781 | 7/1996 | Lee et al. | 324/380 |
| 5,561,239 | 10/1996 | Tasuda | 324/389 |
| 5,584,275 | 12/1996 | Taruya | 324/380 |

FOREIGN PATENT DOCUMENTS

| | | |
|---|---|---|
| 0546827 | 6/1993 | European Pat. Off. . |
| 0652363 | 5/1995 | European Pat. Off. . |
| 0654604 | 5/1995 | European Pat. Off. . |
| 2576506 | 11/1992 | France . |

Primary Examiner—Maura K. Regan
Attorney, Agent, or Firm—Spencer & Frank

[57] ABSTRACT

With a transistor ignition system, in order to generate an ion current measurement signal at the secondary end, the ignition transistor, following an ignition triggering impulse, will be driven such that a saw-toothed collector current results as a primary current, and whose rate of increase is selected such that the quasi-stationary direct voltage generated hereby at the secondary end will not trigger any ignition process. The advantage is that for generating such a measurement signal as well as for its evaluation only a few components are required.

6 Claims, 2 Drawing Sheets

CIRCUIT LAYOUT FOR ION CURRENT MEASUREMENT

BACKGROUND OF THE INVENTION

The invention concerns a circuit arrangement for ion current measurement within the combustion chamber of an internal combustion engine, comprising
a) an ignition coil complete with primary and secondary circuits, and
b) an ignition transistor connected into the primary circuit.

Such a circuit arrangement is known from DE 33 27 766 A1 which is used to detect knocking in an internal combustion engine and where, in the combustion space of each cylinder, a spark plug is located that is also used as an ion current probe. To obtain a measurement signal for the ion current, an alternating voltage will be generated at the primary end of the ignition coil; this alternating voltage will produce an ion current measurement signal at the secondary end, with the ion current variations modulating onto the measurement signal. This amplitude-modulated alternating voltage signal at the secondary end will be decoupled at the secondary end and processed by an evaluation circuit.

This known circuit layout comprises a transistor ignition where a high frequency generator is used to generate the alternating voltage signal at the primary end; the impulse-shaped output signals of this high frequency generator are fed into the control electrode of the ignition transistor. The disadvantage of this known circuit is that, for generating the alternating voltage signal at the primary end as well as for evaluating the modulated alternating voltage signal generated at the secondary end, a considerable number of components are required. In addition to the high frequency generator, a demodulator and several filter arrangements are required to evaluate the measurement signal at the secondary end.

SUMMARY OF THE INVENTION

The object of the invention is to provide a circuit arrangement of the type mentioned above which, in comparison to the known circuit layout for ion current measurement, features a simpler setup.

According to the invention, the ignition coil is driven by a saw-toothed current signal as primary current to generate a quasi-stationary measurement signal at the secondary end. This current signal can also represent a triangular course across a given period. Thus, other than with current state of the art technology, neither a high frequency generator nor a demodulator or filter arrangements—for generating the ion current signal—will be required.

When using an ignition coil complete with both primary and second windings, the measurement signal at the secondary end will be decoupled by means of a test or measuring arrangement located within the secondary circuit of the ignition coil.

With a particularly advantageous development of the invention, the ignition coil is embodied as an autotransformer so that the ion current measurement signal can be tapped directly at the primary end of the ignition coil.

BRIEF DESCRIPTION OF THE DRAWINGS

Using embodiment examples with references to the figures, the invention is to be described and explained below. The figures are as follows.

DESCRIPTION OF THE PREFERRED EMBODIMENTS

Figure 1:
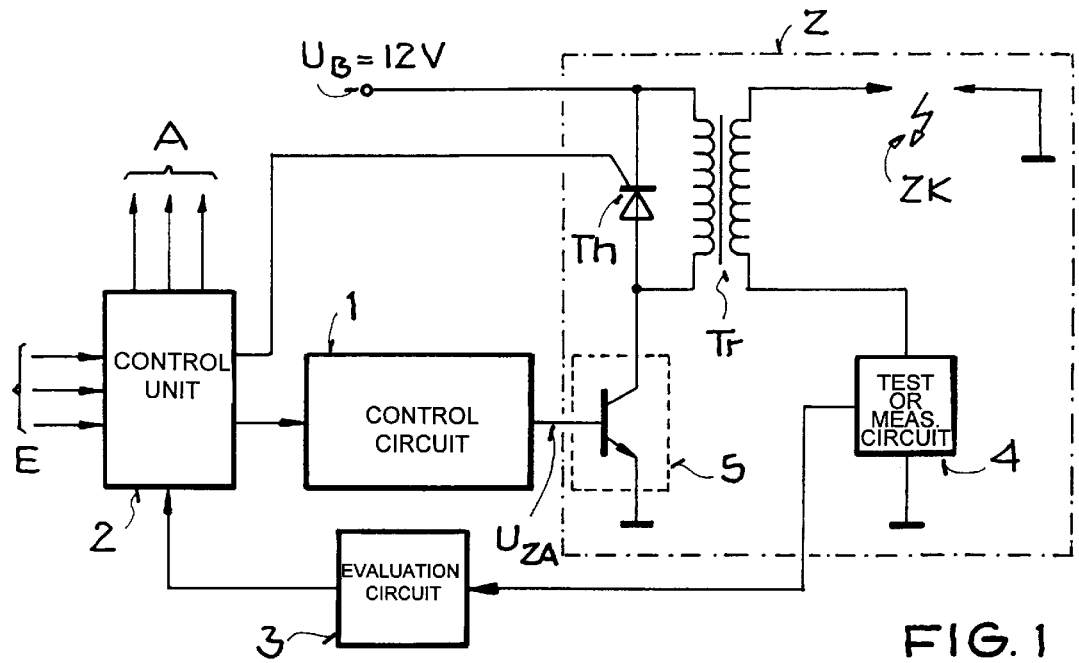
FIG. 1 is a block diagram showing a transistor ignition system according to the invention.
Figure 2:
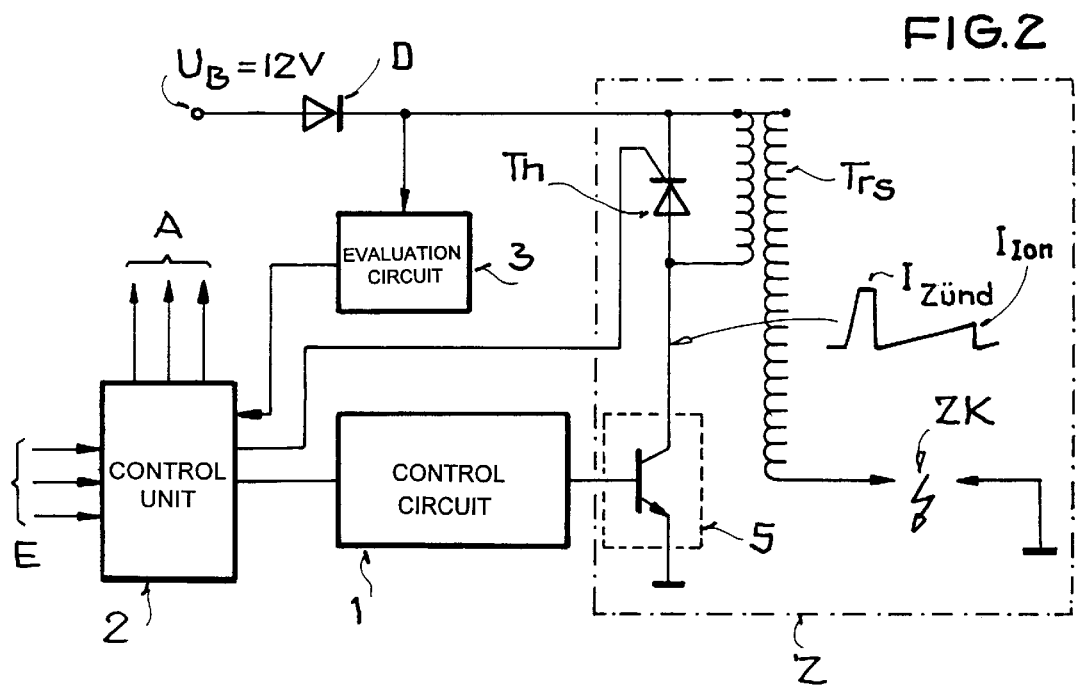
FIG. 2 is a block diagram of a further embodiment of the invention, using an autotransformer as an ignition coil.

For the sake of simplicity, although the transistor ignition systems shown in FIGS. 1 and 2 are suitable for multi-cylinder internal combustion engines, only one ignition output stage Z is drawn, respectively, with one spark plug Zk.

The ignition output stage Z according to FIG. 1 comprises an ignition coil $T_r$ featuring both a primary and a secondary winding, with the above-mentioned spark plug Zk being connected to the secondary winding. One terminal of the primary winding is connected to an operating voltage $U_B$ of 12 V, supplied by the on-board battery of a vehicle, and the other terminal is connected to an ignition transistor 5. In addition, the primary winding can be short-circuited by means of a thyristor Th whose function will be further described below.

A control unit 2 takes over an engine management function and is connected with a control circuit 1 in order to provide for a correct ignition distribution via an appropriate connection line. To this end, this control unit 2 will be supplied by means of an input E with engine parameters such as load, speed, and temperature. Appropriate actuators are controlled via outputs A.

Control circuit 1 generates the ignition trigger impulses $U_{ZA}$ triggered by control unit 2, which are fed to the control electrode of ignition transistor 5 in order to initiate the ignition process at spark plug Zk.

Figure 3A:
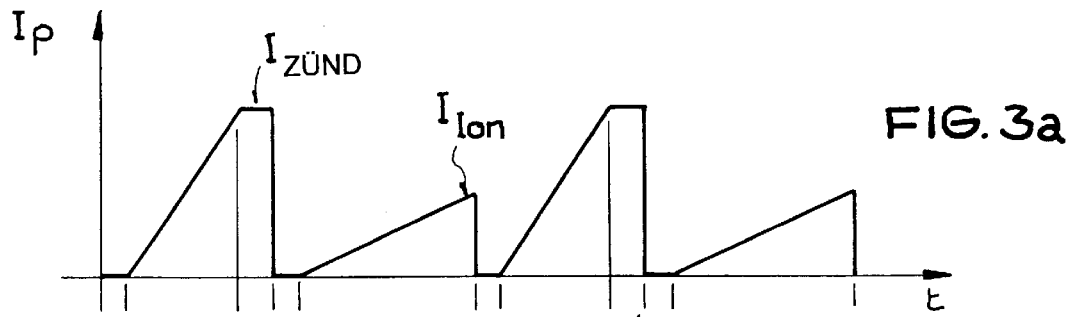
FIGS. 3a and 4a are current-time diagrams showing the current signals fed into the ignition coil at the primary end.
Figure 3B:
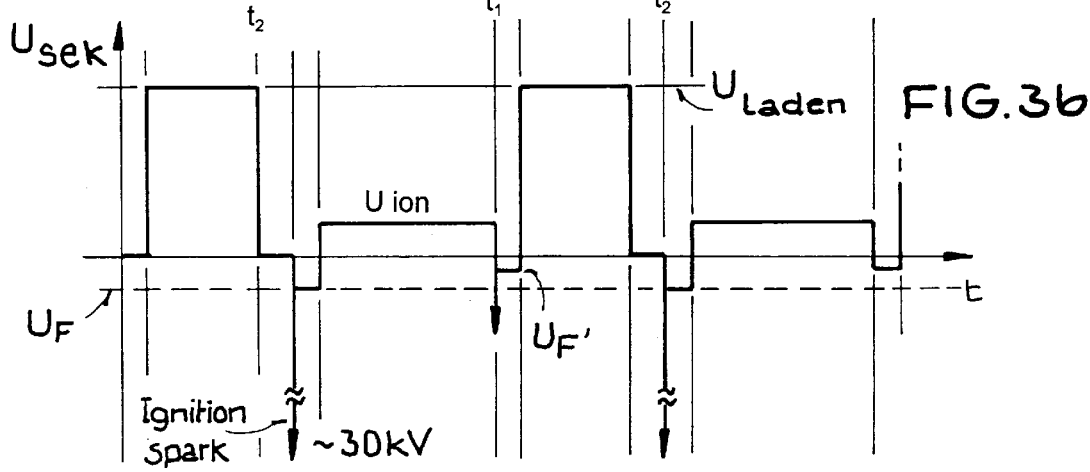
FIGS. 3b and 4b are voltage-time diagrams for the voltage signals generated at the secondary end of the ignition coil.

According to FIG. 3a, such an ignition trigger impulse $U_{ZA}$ will cause the ignition current $I_{ZOnd}$ to increase at the primary end, which ignition current $I_{ZOnd}$ will be switched off at the ignition time $t_Z$. The corresponding voltage course $U_{sek}$ at the secondary end is shown in the diagram according to FIG. 3b, with the charging voltage $U_{Laden}$ being determined by the rate of increase in ignition current $I_{ZOnd}$ according to $dI_{ZOnd}/dt$.

At the ignition time $t_Z$, an ignition spark of approx. 30 kV occurs which generates a spark firing current for a given combustion period at a given combustion voltage $U_F$.

Figure 4A:
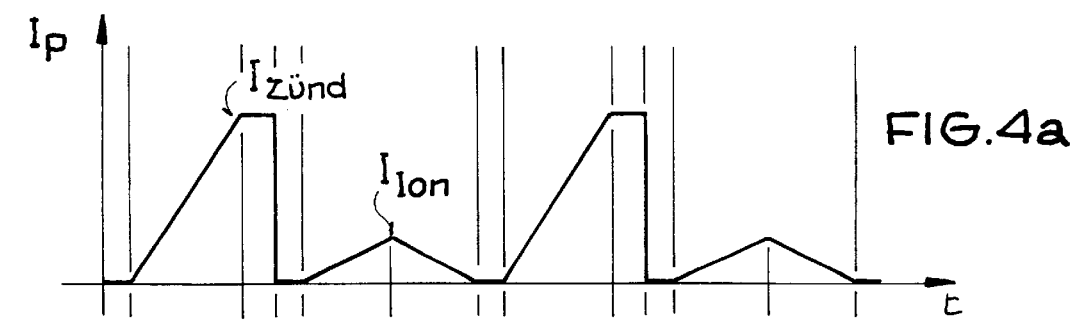
Figure 4B:
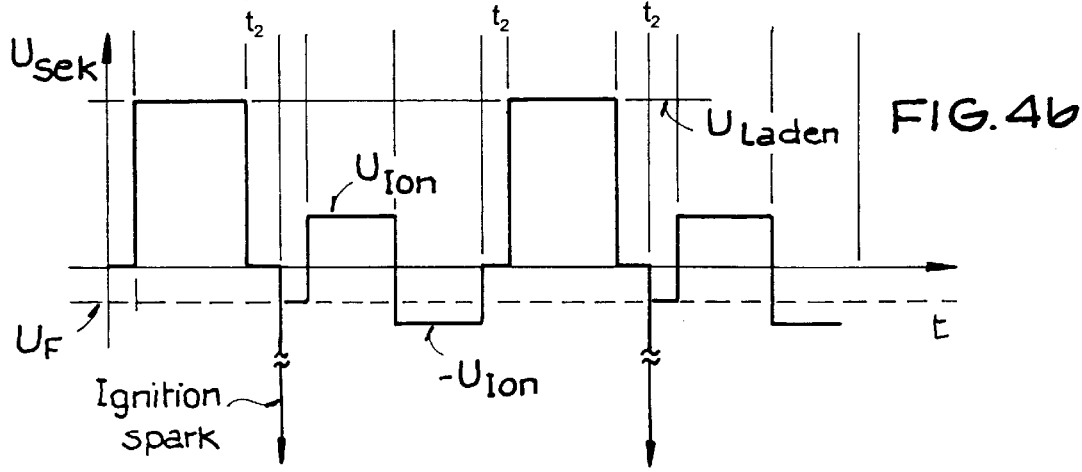

Then, at the primary end of the ignition transformer, a saw-toothed current signal $I_{Ion}$ according to FIG. 3a or a triangular current signal $I_{Ion}$ according to FIG. 4a will be generated, which will produce, at the secondary end, a modulated direct voltage or alternating voltage signal $U_{Ion}$ in relation to the degree of ionisation.

In the first case, in order to avoid an ignition impulse (se FIGS. 3a and 3b) at the time tr, thyristor Th is ignited by control unit 2, if the primary end current signal $I_{Ion}$ reaches the specified final value. However, it is possible to manage without such a thyristor; this is why one ignition will happen during the idling cycle (exhaust cycle) which is completely harmless. The combustion voltage occurring during such ignition is designated as $U_F$ in FIG. 3b.

When using a triangular course for the current signal $I_{Ion}$ at the primary end, its rate of current increase will be selected such that no ignition process will be started at the secondary end. This obviates the need for using a thyristor.

The ion current measurement signal will be decoupled at the secondary end by means of a test or measuring arrangement 4 and fed into an evaluation circuit 3 for evaluation.

The ion current signal generated by this evaluation circuit 3 will be fed into control unit 2. From this ion current signal, control unit 2 obtains information on the combustion process as well as engine behavior such that control quantities for controlling the ignition output stage Z can be derived therefrom.

The transistor ignition according to FIG. 2 differs from that shown in FIG. 1 only in that an autotransformer $Tr_a$ is used as an ignition coil.

As there is no high voltage occurring at the primary end of this ignition coil $Tr_A$, this end—which is connected to operating voltage $U_B$ by means of a decoupling diode D—can be connected directly to evaluation circuit 3. With this circuit layout also, control circuit 1 can generate a direct voltage measurement signal featuring a saw-toothed or triangular course.

Generation of a measurement signal for the ion current by means of a saw-toothed or triangular current signal at the primary end can be used not only for transistor ignition systems as shown in FIGS. 1 and 2 but also in high voltage capacitor ignitions. One such high voltage capacitor ignition system is known from DE-OS 24 55 536.

From the useful signals fed into control unit 2, information about the combustion process and engine behavior can be derived in order to derive control quantities for controlling the ignition system; these control quantities can then be fed into control circuit 1.

It will be possible, for example, to carry out a knocking signal evaluation which will cause ignition timing to be controlled and does not require any body noise sensor liable to suffer from interference noise. Furthermore, the information on the combustion process can be used to carry out an ignition energy control process; in particular, it is possible to determine the cylinder pressure co-fed into the lambda control system and injection control system. Furthermore, a cylinder-1-detection may be derived from the useful signal. In addition, intermittent ignition can be detected in order to avoid damage to the catalytic converters. Finally, it is also possible to derive a load detection from the useful signal in order to carry out a cylinder-selective quietness control and cylinder-filling even distribution.

What is claimed is:

1. Circuit arrangement for ion current measurement within the combustion chamber of an internal combustion engine, comprising:

an ignition coil complete with primary and secondary circuits, an ignition transistor connected in the primary circuit, a spark plug connected in the secondary circuit, which spark plug serves as ion current probe, a control circuit which, in order to generate an ion current measurement signal in the secondary circuit, drives the ignition transistor such that an ignition trigger impulse followed by a period of a saw-toothed current signal are generated by the control circuit as the primary current of the ignition coil, and, a measuring circuit connected to one of the primary and secondary circuits for detecting the ion current measurement signal to determine the ion current.

2. Circuit arrangement according to claim 1 wherein the ignition coil comprises both a primary winding as well as a secondary winding, and wherein the measuring circuit for the ion current measurement signal is located within the secondary circuit of the ignition coil.

3. Circuit arrangement according to claim 1 wherein the ignition coil is an autotransformer and the measuring circuit for the measurement signal for the ion current is connected to the primary end of the ignition coil.

4. Circuit arrangement for ion current measurement within the combustion chamber of an internal combustion engine, comprising:

an ignition coil complete with primary and secondary circuits, an ignition transistor connected in the primary circuit, a spark plug connected in the secondary circuit, which spark plug serves as ion current probe, a control circuit which, in order to generate an ion current measurement signal in the secondary circuit, drives the ignition transistor such that an ignition trigger impulse followed by a period of a triangular-shaped current signal are generated by the control circuit as the primary current of the ignition coil, and, a measuring circuit connected to one of the primary and secondary circuits for detecting the ion current measurement signal to determine the ion current.

5. Circuit arrangement according to claim 4 wherein the ignition coil comprises both a primary winding as well as a secondary winding, and wherein the measuring circuit for the ion current measurement signal is located within the secondary circuit of the ignition coil.

6. Circuit arrangement according to claim 4 wherein the ignition coil is an autotransformer and the measuring circuit for the measurement signal for the ion current is connected to the primary end of the ignition coil.

* * * * *